US012714991B2

(12) United States Patent
Pennell et al.

(10) Patent No.: US 12,714,991 B2
(45) Date of Patent: Aug. 25, 2026

(54) FORMULATIONS AND PROCESSES FOR TREATING WATER FROM IMPACTED SOURCES

(71) Applicant: Brown University, Providence, RI (US)

(72) Inventors: Kurt Pennell, Waban, MA (US); Chen Liu, Providence, RI (US)

(73) Assignee: Brown University, Providence, RI (US)

( * ) Notice: Subject to any disclaimer, the term of this patent is extended or adjusted under 35 U.S.C. 154(b) by 844 days.

(21) Appl. No.: 17/995,639

(22) PCT Filed: Apr. 6, 2021

(86) PCT No.: PCT/US2021/025884
§ 371 (c)(1),
(2) Date: Oct. 6, 2022

(87) PCT Pub. No.: WO2021/207132
PCT Pub. Date: Oct. 14, 2021

(65) Prior Publication Data

US 2023/0219075 A1 Jul. 13, 2023

Related U.S. Application Data

(60) Provisional application No. 63/005,813, filed on Apr. 6, 2020.

(51) Int. Cl.

| | |
|---|---|
| ***B01J 47/018*** | (2017.01) |
| ***B01D 15/36*** | (2006.01) |
| ***B01J 41/05*** | (2017.01) |
| ***B01J 41/07*** | (2017.01) |
| ***B01J 41/12*** | (2017.01) |

(Continued)

(52) U.S. Cl.
CPC .......... *B01J 47/018* (2017.01); *B01D 15/361* (2013.01); *B01J 41/05* (2017.01); *B01J 41/07* (2017.01); *B01J 41/12* (2013.01); *C02F 1/42* (2013.01); *C02F 1/547* (2013.01); *C02F 1/56* (2013.01);

(Continued)

(58) Field of Classification Search
None
See application file for complete search history.

(56) References Cited

U.S. PATENT DOCUMENTS 6,030,467 A * 2/2000 Leser ........................ B09C 1/02 134/40
6,210,078 B1 * 4/2001 Redwine ................ B09C 1/085 134/28

(Continued)

OTHER PUBLICATIONS

BioRad (UNOSPHERE™ Q Anion Exchange Resin, 2016, pp. 1-4, https://www.bio-rad.com/webroot/web/pdf/lsr/literature/Bulletin_2724.pdf). (Year: 2016).*

(Continued)

*Primary Examiner* — Clare M Perrin
(74) *Attorney, Agent, or Firm* — Banner & Witcoff, Ltd.

(57) ABSTRACT

This invention relates to an aqueous composition comprising, (a) an ion-exchange resin (IXR) comprising microporous beads having a particle size ranging from about 200 um to about 1000 um; (b) a water soluble surfactant having a molecular weight ranging from about 7,500 to about 15,000 Da; and (c) a buffer component; wherein the pH of the aqueous composition ranges from about 5 to about 8, and a process for isolating chemical contaminants using the aqueous composition.

12 Claims, 3 Drawing Sheets

Schematic diagram of the experimental system used for the S-IXR column studies.

(51) Int. Cl.
*C02F 1/42* (2023.01)
*C02F 1/54* (2023.01)
*C02F 1/56* (2023.01)
*C02F 101/36* (2006.01)

(52) U.S. Cl.
CPC .... *C02F 2001/422* (2013.01); *C02F 2101/36* (2013.01)

(56) References Cited

U.S. PATENT DOCUMENTS

| | | | | |
|---|---|---|---|---|
| 6,350,383 | B1 * | 2/2002 | Douglas | B01J 20/0288 210/683 |
| 2003/0183253 | A1 | 10/2003 | Cornelius et al. | |
| 2005/0161404 | A1 | 7/2005 | Jensen et al. | |
| 2014/0193875 | A1 | 7/2014 | Wickert et al. | |
| 2015/0182875 | A1 | 7/2015 | Pohl et al. | |
| 2015/0232359 | A1 | 8/2015 | Wilson et al. | |
| 2016/0136702 | A1 | 5/2016 | Noland et al. | |
| 2017/0332627 | A1 * | 11/2017 | Rawden | C05F 11/10 |
| 2019/0176101 | A1 * | 6/2019 | Phillips | C02F 1/008 |
| 2020/0299650 | A1 * | 9/2020 | Qu | B01D 15/362 |

OTHER PUBLICATIONS

Khodadoust et al. (Journal of Hazardous Materials, 2005, B117, 15-24). (Year: 2005).*

Torres et al. (Physics and Chemistry of the Earth, 2012, 37-39, 30-36). (Year: 2012).*

Shah et al. (Chemical Reviews, 2016, 116, 6042-6074). (Year: 2016).*

Slizovskiy et al. (Environmental Toxicology and Chemistry, 2011, 30, 112-123, Abstract only provided). (Year: 2011).*

Hadia Anwar "Mohammed Ameen" Inaya (M. Sc. Thesis, 2008, pp. 1-51). (Year: 2008).*

Millipore Sigma, Pluronic L64, accessed online on Nov. 10, 2025, pp. 1-4). (Year: 2025).*

"International Search Report and Written Opinion received for PCT Patent Application No. PCT/US2021/025884, mailed on Jun. 30, 2021", 11 pages.

Carey , et al., "Evaluating the longevity of a PFAS in situ colloidal activated carbon remedy", Remediation, vol. 29, No. 2, 2019, pp. 17-31.

Liu , et al., "In-situ sequestration of perfluoroalkyl substances using polymer-stabilized ion exchange resin", Journal of Hazardous Materials, vol. 422,, Jan. 15, 2022, 9 pages.

McGregor, Rick , "In Situ treatment of PFAS-impacted groundwater using colloidal activated Carbon", Remediation, vol. 28, No. 3,, 2018, pp. 33-41.

* cited by examiner

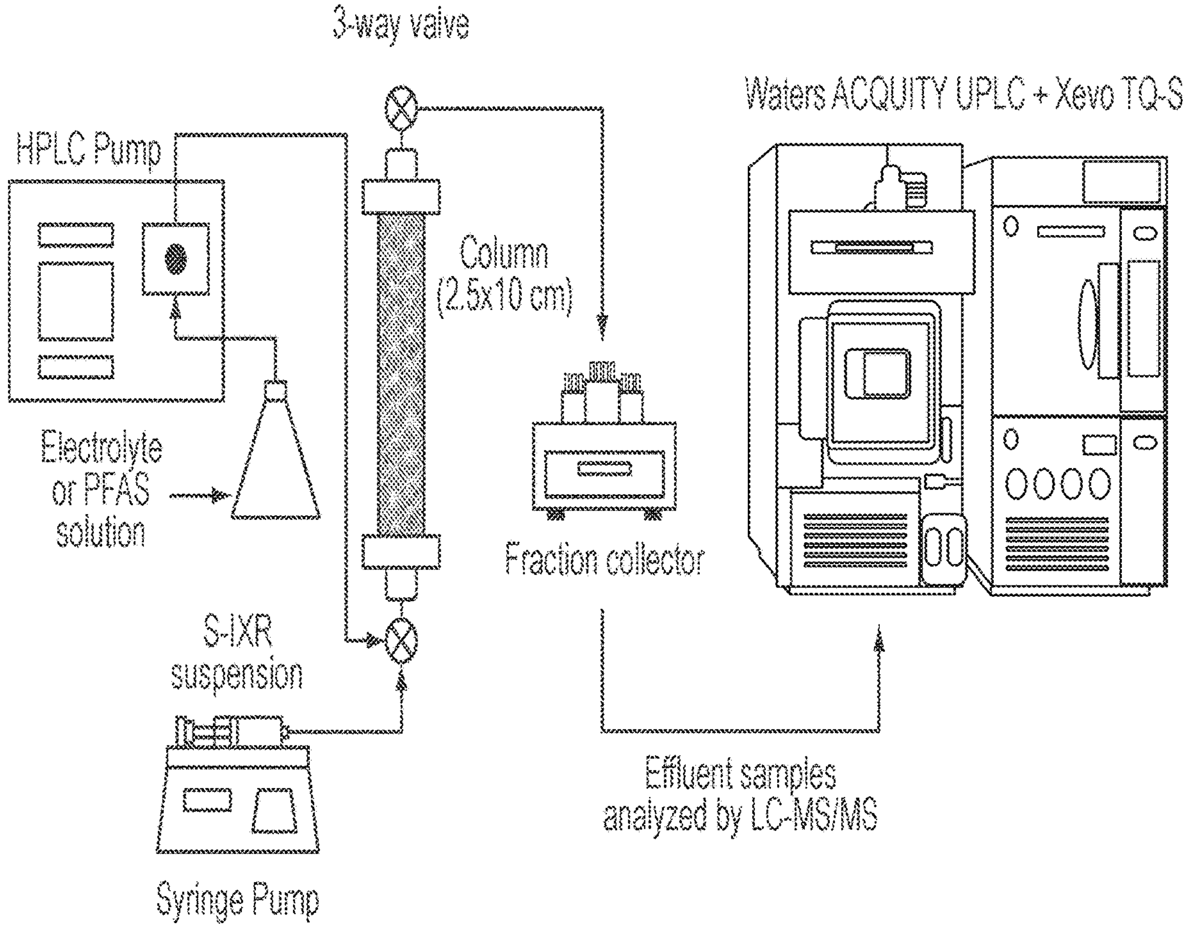
FIG. 1: Schematic diagram of the experimental system used for the S-IXR column studies.

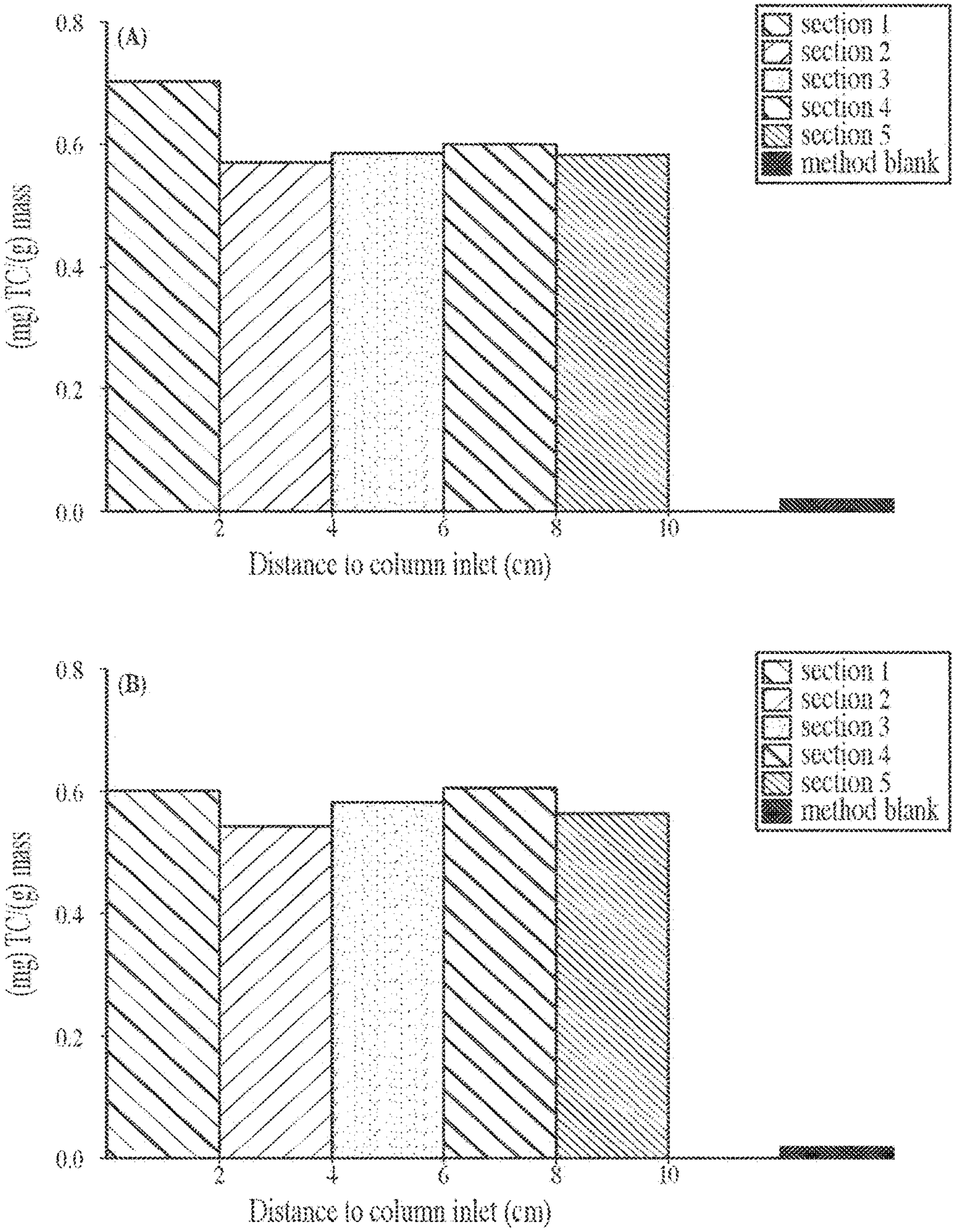
FIG. 2: Distribution of retained carbon after the injection of 3.5 pore volumes of S-IXR into a column packed with water-saturated 40-50 mesh Ottawa sand followed by 3.5 pore volumes of background electrolyte solution (10 mM NaCl) at a flow rate of 0.12 mL/min prior to (A) PFOA injection and (B) PFOS injection. 67.1 mg as IRA910 was retained in (A) and 61.3 mg as IRA910 was retained in (B).

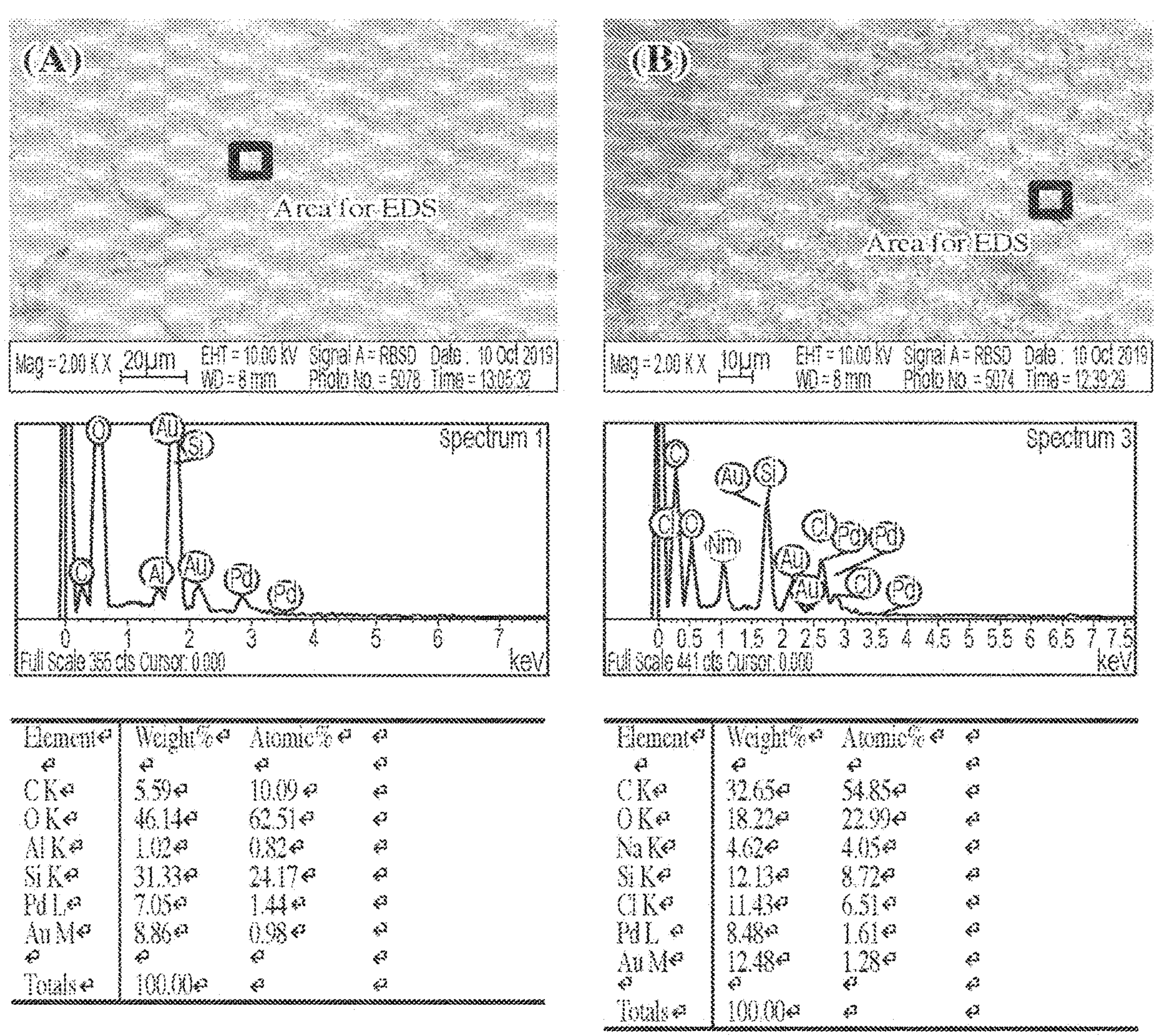
| Element | Weight% | Atomic% |
|---|---|---|
| C K | 5.59 | 10.09 |
| O K | 46.14 | 62.51 |
| Al K | 1.02 | 0.82 |
| Si K | 31.33 | 24.17 |
| Pd L | 7.05 | 1.44 |
| Au M | 8.86 | 0.98 |
| Totals | 100.00 | |
| Element | Weight% | Atomic% |
|---|---|---|
| C K | 32.65 | 54.85 |
| O K | 18.22 | 22.99 |
| Na K | 4.62 | 4.05 |
| Si K | 12.13 | 8.72 |
| Cl K | 11.43 | 6.51 |
| Pd L | 8.48 | 1.61 |
| Au M | 12.48 | 1.28 |
| Totals | 100.00 | |
FIG. 3: Images of 40-50 mesh Ottawa sand (A) before and (B) after treatment with S-IXR obtained using a Zeiss Leo 1530 VP Scanning Electron Microscope (SEM) coupled with an Oxford Instruments 7426 Energy Dispersive Spectrometer (EDS).

FORMULATIONS AND PROCESSES FOR TREATING WATER FROM IMPACTED SOURCES

CROSS REFERENCE TO RELATED APPLICATIONS

This application is a national phase filing under 35 U.S.C. § 371 of International Application No. PCT/US2021/025884 filed Apr. 6, 2021, which claims priority from U.S. Provisional Patent Application No. 63/005,813 filed Apr. 6, 2020, the contents of which are incorporated herein in their entirety.

STATEMENT REGARDING FEDERALLY SPONSORED RESEARCH OR DEVELOPMENT

This invention was made with government support under grant number W912HQ-18-C-0002 awarded by the United States Army Soldier Systems Center. The government has certain rights in the invention.

FIELD OF THE INVENTION

This invention relates to an aqueous composition comprising, (a) an ion-exchange resin (IXR) comprising microporous beads having a particle size ranging from about 200 um to about 1000 um; (b) a water soluble surfactant having a molecular weight from about 7,500 to about 15,000 Da; and (c) a buffer component; wherein the pH of the aqueous composition ranges from about 5 to about 8, and a process for isolating chemical contaminants using the aqueous composition.

BACKGROUND OF THE INVENTION

Ground water is a major source of our drinking water as well as for agricultural purposes. Clean ground water is therefore essential for our use on a daily basis. Ground water is however impacted by contaminants, including chemical contaminants from man-made sources, such as manufacturing plants. Groundwater is commonly impacted by chemical substances including per- and polyfluoroalkyl substances (PFAS). Removing these chemical substances from ground water is challenging due to the strength of the carbon-fluorine bond and the need to achieve nanogram per liter drinking water targets. Studies have shown that ion exchange resins can serve as effective sorbents for the removal of perfluorooctanoic acid (PFOA) and perfluorooctane sulfonic acid (PFOS) in conventional water treatment systems.

Widespread use has led to persistence of per- and polyfluoroalkyl substances (PFAS) as a major component of chemical impurity/contaminant in the environment, impacting both surface water and groundwater supplies. A national survey of six PFAS conducted by the U.S. Environmental Protection Agency (USEPA) from 2013-2015 found that 1.6% of the samples collected from public water supply systems were contaminated with PFAS, with concentrations ranging from about 0.01 to 7 ug/L, as reported by Guelfo, J. L.; and Adamson, D. T. (Evaluation of a national data set for insights into sources, composition, and concentrations of per- and polyfluoroalkyl substances (PFASs) in U.S. drinking water. Environ. Pollut. 2018, 236, 505-513).

Although the total number of PFAS-impacted sites in the US remains uncertain, a recent analysis suggests that more than 40,000 sites are contaminated with PFAS at levels that will require remedial action. Despite concerted efforts to develop in situ treatment technologies for PFAS, the strength of the carbon-fluorine bond has limited the potential application of chemical and biological transformation processes, as reported by Kucharzyk, K. H.; Darlington, R.; Benotti, M.; Deeb, R.; Hawley, E. (Novel treatment technologies for PFAS compounds: A critical review. J. Environ. Manage. 2017, 204, 757-764), and Lu, D.; Sha, S.; Luo, J.; Huang, Z.; Zhang Jackie, X. (Treatment train approaches for the remediation of per- and polyfluoroalkyl substances (PFAS): A critical review. Journal of Hazardous Materials. Elsevier B.V. Mar. 15, 2020, p 121963).

Due to the limitations mentioned above, PFAS-impacted groundwater plumes are typically managed using "pump and treat" systems, where extracted water is treated above ground by granular activated carbon (GAC) or ion exchange resin (IXR). However, the adsorption capacity of activated carbon is known to decline precipitously for short-chain length PFAS and precursors, while resins have been shown to demonstrate more consistent removal efficiency for both long- and short-chained PFAS.

Given the limitations for in situ remediation of PFAS-impacted groundwater, there remains a need for technologies that involve creating a permeable adsorptive barrier (PAB) that acts to sequester PFAS, with the goal of concentrating contaminant mass and limiting subsequent migration.

SUMMARY OF THE INVENTION

In one aspect of the instant invention is provided an aqueous composition comprising, (a) an ion-exchange resin (IXR) comprising microporous beads having a particle size ranging from about 200 um to about 1000 um; (b) a water soluble surfactant having a molecular weight from about 7,500 to about 15,000 Da; and (c) a buffer component; wherein the pH of the aqueous composition ranges from about 5 to about 8.

Another aspect of the instant invention provides a process of isolating chemical contaminants, said process comprising contacting an absorptive zone with a source comprising the chemical contaminants, wherein the absorptive zone comprises an aqueous composition comprising, (a) an ion-exchange resin (IXR) comprising microporous beads having a particle size ranging from about 200 um to about 1000 um; (b) a water soluble surfactant having a molecular weight from about 7,500 to about 15,000 Da; and (c) a buffer component; wherein the pH of the aqueous composition ranges from about 5 to about 8.

BRIEF DESCRIPTION OF THE DRAWINGS

For the purpose of illustration, certain embodiments of the present invention are shown in the drawings described below. Like numerals in the drawings indicate like elements throughout. It should be understood, however, that the invention is not limited to the precise arrangements, dimensions, and instruments shown. In the drawings:

FIG. 1 is a schematic diagram of the experimental system used for S-IXR column studies.

FIG. 2 is a distribution of retained resin particles after injecting of 3.5 pore volumes of S-IXR into a column packed with water-saturated 40-50 mesh Ottawa sand followed by 3.5 pore volumes of background electrolyte solution (10 mM NaCl).

FIG. 3 is images of 40-50 mesh Ottawa sand (A) before and (B) after treatment with S-IXR obtained using a Zeiss Leo 1530 VP Scanning Electron Microscope (SEM) coupled with an Oxford Instruments 7426 Energy Dispersive Spectrometer (EDS).

DETAILED DESCRIPTION OF THE INVENTION

It is to be appreciated that certain aspects, modes, embodiments, variations and features of the invention are described below in various levels of detail in order to provide a substantial understanding of the present invention.

In one aspect of the instant invention is provided an aqueous composition comprising, (a) an ion-exchange resin (IXR) comprising microporous beads having a particle size ranging from about 200 um to about 1000 um; (b) a water soluble surfactant having a molecular weight from about 7,500 to about 15,000 Da; and (c) a buffer component; wherein the pH of the aqueous composition ranges from about 5 to about 8.

Another embodiment provides a composition wherein the IXR is selected from Amberlite IRA910, Amberlite IRA67, and Amberlite IRA 400, and wherein the IXR particle size ranges from about 300 um to about 850 um.

Yet another embodiment provides a composition wherein the surfactant is a water-soluble polymer selected from Pluronic F-127, Tween 80, Gum Arabic, and HEC-10. A preferred embodiment provides a composition wherein the aqueous composition has a viscosity from about 2 centipoises to about 8 centipoises, preferably from about 3 centipoises to about 6 centipoises.

Provided in another embodiment is a composition wherein the buffer is a salt selected from NaCl, NaOH, $CaCl_2$), $Ca(OH)_2$, and KCl, preferably a salt is selected from NaCl and NaOH.

Yet another embodiment provides a composition wherein, the IXR concentration in the aqueous mixture ranges from about 3000 PPM to about 7000 PPM; and the concentration of the water-soluble polymer ranges from about 800 PPM to about 1200 ppm. A preferred embodiment of this aspect provides a composition wherein the IXR concentration in the aqueous mixture ranges from about 4000 PPM to about 6000 PPM; and the concentration of the water-soluble polymer ranges from about 1000 PPM to about 2000 ppm.

Preferred aspects of the invention provide an aqueous composition comprising, (a) an ion-exchange resin (IXR) comprising microporous beads having a particle size ranging from about 300 um to about 850 um; (b) a water-soluble surfactant having a molecular weight from about 10,000 to about 15,000 Da; (c) a buffer component selected from NaCl, NaOH, $CaCl_2$, and KCl; wherein the pH of the aqueous composition ranges from about 5 to about 8. A further preferred aspect provides an aqueous composition comprising, (a) an ion-exchange resin (IXR) IXR is selected from Amberlite IRA910, Amberlite IRA67, and Amberlite IRA 400; (b) wherein the surfactant is a water-soluble polymer selected from Pluronic F-127, Tween 80, Gum Arabic, and HEC-10.

Another aspect of the instant invention provides a process of isolating chemical contaminants, said process comprising contacting an absorptive zone with a source comprising the chemical contaminants, wherein the absorptive zone comprises an aqueous composition comprising, (a) an ion-exchange resin (IXR) comprising microporous beads having a particle size ranging from about 200 um to about 1000 um; (b) a water soluble surfactant having a molecular weight from about 7,500 to about 15,000 Da; and (c) a buffer component; wherein the pH of the aqueous composition ranges from about 5 to about 8.

Yet another aspect provides a process of isolating chemical contaminants, said process comprising contacting an absorptive zone with a source comprising the chemical contaminants, wherein the absorptive zone comprises an aqueous composition comprising, (a) an ion-exchange resin (IXR) comprising microporous beads having a particle size ranging from about 200 um to about 1000 um; (b) a water-soluble surfactant having a molecular weight from about 7,500 to about 15,000 Da; and (c) a buffer component; wherein the pH of the aqueous composition ranges from about 5 to about 8.

Another embodiment of this aspect provides a process wherein the absorptive zone comprises solid host soil particles coated with the aqueous composition, and wherein the solid host soil particles of the absorptive zone essentially consist of sand, silt, and clay minerals.

Yet another embodiment provides a process wherein, the absorptive zone is created by injecting the aqueous composition in an area needing isolation of the chemical contaminants. Another embodiment provides a process wherein, the chemical contaminants comprise chemical entities having a strong carbon-halogen bond and further the chemical entities are ionic in nature, in particular, the chemical entities are selected perfluoro alkyl and polyfluoroalkyl substances (PFAS).

Provided in yet another aspect is a process wherein, the IXR is selected from is selected from Amberlite IRA910, Amberlite IRA67, and Amberlite IRA 400, wherein the IXR particle size ranges from about 100 μm to about 800 μm. Yet another embodiment provides a process wherein the water-soluble surfactant is a water-soluble polymer selected from Pluronic F-127, Tween 80, Gum Arabic, and HEC-10. Another embodiment provides a process wherein the aqueous composition has a viscosity from about 2 centipoises to about 8 centipoises.

Another aspect of the invention provides a process wherein the buffer is a salt selected from NaCl, NaOH, $CaCl_2$, $Ca(OH)_2$, and KCl, preferably the buffer salt is selected from NaCl and NaOH. Another aspect provides a process wherein the aqueous composition has a viscosity of from about 2 centipoises to about 8 centipoises.

Yet another embodiment provides a process wherein, the IXR concentration in the aqueous mixture ranges from about 3000 PPM to about 7000 PPM; and the concentration of the water-soluble polymer ranges from about 800 PPM to about 1200 ppm.

Another aspect of the present invention provides a process of isolating chemical contaminants, said process comprising contacting an absorptive zone comprising solid host particles mixed with an aqueous mixture, with a source comprising the chemical contaminants, wherein, (a) the solid host soil particles of the absorptive zone essentially consist of sand, silt, and clay minerals; (b) the aqueous mixture comprises (i) an ion-exchange resin (IER) having a particle size ranging from about 350 μm to about 800 μm; (ii) a water-soluble polymer selected from Pluronic F-127, Tween 80, Gum Arabic, and HEC-10, having a viscosity of from about 2 centipoises to about 8 centipoises; (iii) a buffer component selected from NaCl, NaOH, $CaCl_2$), and KCl; and (iv) the pH of the aqueous composition ranges from about 5 to about 8; and (c) the chemical contaminants are selected from perfluoro alkyl, polyfluoroalkyl compounds, arsenic compounds, perchlorates, organic matter, organic acids, and ionic water contaminants selected from organic acids, and ionic water contaminants selected from nitrates, phosphates, and halogens.

Another aspect provides a process wherein the absorptive zone is created by injecting the aqueous mixture in an area contaminated with chemical contaminants. Yet another aspect provides a process wherein water from a drinking water source contaminated with chemical contaminants is passed through the absorptive zone.

EXAMPLES

The invention now being generally described, it will be more readily understood by reference to the following examples which are included merely for purposes of illustration of certain aspects and embodiments of the present invention, and are not intended to limit the invention.

Illustrative examples of the formulations of the instant invention were prepared as discussed below. Processes of the instant invention were carried out as discussed below as well.

Materials and Methods: Analytical standards (>99% purity) containing 16 PFAS, including PFOS and PFOA, were purchased from Waters (Milford, MA) as calibration standards. Perfluoro-n-[1,2,3,4-13C4]-octanoic acid and sodium perfluoro-1-[1,2,3,4-13C4]-octanesulfonate were purchased from Wellington Labs (>99% purity) to serve as internal standards. PFOS potassium salt (98% purity) and PFOA (96% purity) were purchased from Sigma-Aldrich (St. Louis, MO) for preparation of aqueous solutions disclosed in the present invention. Ottawa sand (40-50 mesh) was selected as a solid host for this study to represent a high permeability, low adsorption capacity aquifer material that would be generally found in the soil/grouond. The 40-50 mesh size fraction was obtained by sieving F-50 Ottawa sand (U.S. Silica, Berkeley Springs, WV) for 10 min cycles with a Model RX-29 Ro-Tap sieve shaker (W. S. Tayler, Inc., Mentor, OH). Aqueous solutions were prepared with deionized (DI) water (18.2 MQ2 cm-1, total OC<5 μg/L) that had passed through a Milli-Q® Reference Water Purification System (MilliporeSigma, Burlington, MA).

Pluronic® F-127, and Amberlite® IRA910 anionic exchange resin in the chloride form were purchased from Sigma-Aldrich. The procedure for preparing the polymer stabilized ion exchange resin suspension (S-IXR) consisted of the following three steps: Amberlite® IRA910 beads were placed in stainless-steel vials and subjected to ball-mill grinding (SPEX SamplePrep, Metuchen, NJ) for 30 min to yield ground beads. Said ground beads (5,000 mg/L) were then transferred to a Vanaheim KB64 blender (Vanaheim, City of Industry, CA) and mixed with 1,500 mg/L Pluronic® F-127 in 10 mM NaCl at 18,000 rpm for 30 min to yield a mixture. The mixture was then sonicated for 30 min in a Fisherbrand™ CPX3800 ultrasonic bath to obtain the final S-IXR suspension.

Batch absorption tests were conducted to determine the absorption of chemical contaminants using the formulation (s) and processes of the instant invention. For batch adsorption tests, 125 mL Nalgene™ HDPE bottles (Thermo Fisher Scientific, Waltham, MA) were used to mix 10 mg of ground Amberlite® IRA910 beads with 100 mL 10 mM NaCl and either PFOA or PFOS as an aqueous solution/mixture at concentrations ranging from about 0 to 500 mg/L to yield a batch absorption mixture. The batch absorption mixtures were prepared in triplicate with negative controls at the same PFAS concentration without IRA910 beads, and blank controls containing only IRA910 beads and 10 mM NaCl. The solution pH in all mixtures was adjusted to 6 with NaOH. The contents of the HDPE bottles were agitated for 72 h on an orbital shaker at 150 rpm. The mixing time was selected based on previous studies that have evaluated PFAS adsorption on activated carbon. After mixing, the contents were allowed to settle for 1 h and 1 mL of supernatant were transferred to a polypropylene centrifuge tube and centrifuged at 4,000 rpm for 30 min. The supernatant was then filtered through 0.45 μm GE Healthcare Whatman™ GD/X Glass Micro Fiber (GMF) syringe filters (GE Healthcare, Chicago, IL) prior to analysis.

Column experiments were performed to assess the delivery of the S-IXR suspension and retention of resin within the column, and to quantify the sorption of PFOA or PFOS under dynamic conditions following the S-IXR treatment. Borosilicate glass columns (2.5 cm i.d.×10 cm length) were packed with air-dried 40-50 mesh Ottawa sand, flushed with $CO_2$ gas for 1 h, and then saturated with 10 pore volumes (PV) of degassed background electrolyte solution (10 mM NaCl) at a flow rate of 1.0 mL/min, which corresponds to a pore-water velocity (vp) of 7.8 m/day. Non-reactive tracer tests were performed before and after the S-IXR treatment by injecting 3.5 PV of 10 mM NaBr followed by 3.5 PV 10 mM NaCl using a Chrome Tech P-010 isocratic pump (Apple Valley, MN). A schematic diagram of the column apparatus is shown in FIG. 1.

To assess the delivery and retention of resin beads, a pulse (3.5 PV) of S-IXR suspension was introduced into the water-saturated column at a flow rate of 0.12 mL/min ($v_p$=0.945 m/day) using a Chemyx Nexus 3000 syringe pump (Stafford, TX). The column was then flushed with 10 mM NaCl at the same flow rate to remove any unretained Amberlite® IRA910 and Pluronic F-127. Aqueous solutions containing either PFOS (100 μg/L) or PFOA (100 μg/L) in 10 mM NaCl were injected into S-IXR treated columns at a flow rate of 0.12 mL/min. After approximately 7 PV, the influent concentration of PFOA or PFOS was increased from about 100 μg/L to about 100 mg/L to determine to maximum adsorption capacity. Effluent samples were collected continuously using a fraction collector to monitor for PFOA and PFOS breakthrough; at the conclusion of each experiment sand was removed in 5 increments (ca. 20 g each) to obtain S-IXR retention profiles.

The foregoing written specification is considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize, or be able to ascertain using no more than routine experimentation, many equivalents to the specific embodiments described herein. Such equivalents are intended to be encompassed by the following claims.

Examples: The following example(s) further illustrate the composition(s) of the present invention:

Example 1: Preparation of stabilized ion exchange resin (S-IXR): Ion exchange resin beads (1.25 g) were placed in a ball mill grinder for minutes to reduce the average size of the beads from about 500 um to less than 100 um. The ground resin beads were then placed in 250 mL of aqueous solution containing 1,500 mg/L of nonionic polymer to achieve a bead concentration of about 5,000 mg/L. The resulting solution was mixed in a blender for 30 minutes and then transferred to a sonication batch for an additional 30 minutes. The resulting stable suspension contained resin beads with an average diameter of about 200 μm.

The process described in Example 2 illustrates/exemplifies the process of the present invention.

Example 2: Measurement of PFAS adsorption by ground resin beads: Approximately 10 mg of ground resin beads were added to 125 mL HPDE bottles containing 100 ml of water that contained 10 mM NaCl and either individual PFAS or a PFAS mixture. The initial concentration of the PFAS or PFAS mixture ranged from 10 mg/L to 500 mg/L. Each concentration was prepared in triplicate and method blanks (without resin beads) were also prepared in triplicate to account for any losses. The bottles were mixed on an orbital shaker for 72 hours at 150 rpm. After mixing, the bottles were allowed to stand for 1 hour and then a 1 mL aliquot of the supernatant was transferred to a polypropylene centrifuge tube, centrifuged at 4,000 rpm for 30 minutes, and then filtered and diluted prior to analysis using a liquid chromatography triple quadrupole mass spectrometer. The adsorbed concentration of PFAS (mg/g) was calculated based on the change in the aqueous concentration of PFAS before and after contact with the ground resin beads and the mass of resin beads in the bottle.

Example 3: Measurement of PFAS sequestration by S-IXR treated sand: Glass columns were packed with air-dried quartz sand in 1-cm increments until the column was completely filled with sand. The column was then sealed with the upper end plate and completely saturated with de-aired water containing 10 mM NaCl as the background electrolyte. Following complete water saturation, a non-reactive tracer test was conducted to determine the hydrodynamic dispersion coefficient for the water-saturated column and to ensure that flow was uniform (i.e., no preferential flow paths). The S-IXR suspension was then injected into the column to uniformly coat the quartz sand with resin (see FIG. 2 and FIG. 3). Once the sand was coated with resin, a solution containing either individual PFAS or a PFAS mixture was introduced into the column to determine how much PFAS could be retained by the S-IXR treated sand. Based on the amount of PFAS introduced into the column and the time required for PFAS to exit the column, referred to as breakthrough, the mass (mg) of PFAS retained by S-IXR treated sand is calculated.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Figures

For the purpose of illustration, certain embodiments of the present invention are shown in the drawings described below. Like numerals in the drawings indicate like elements throughout. It should be understood, however, that the invention is not limited to the precise arrangements, dimensions, and instruments shown. In the drawings:

FIG. 1 is a schematic diagram of the experimental system used for S-IXR column studies. A schematic diagram of the column apparatus is shown in FIG. 1.

FIG. 2 is a distribution of retained resin particles after injecting of 3.5 pore volumes of S-IXR into a column packed with water-saturated 40-50 mesh Ottawa sand followed by 3.5 pore volumes of background electrolyte solution (10 mM NaCl).

This graph shows that the ion exchange resin was uniformly retained on the quartz sand over the entire length of the column. This type of surface coverage ensures that process will be effective throughout the treated zone, as opposed to just near the point of injection.

FIG. 3 is images of 40-50 mesh Ottawa sand (A) before and (B) after treatment with S-IXR obtained using a Zeiss Leo 1530 VP Scanning Electron Microscope (SEM) coupled with an Oxford Instruments 7426 Energy Dispersive Spectrometer (EDS).

These images show the clean sand before (left hand image) and after (right hand figure) after injecting the stabilized ion exchange resin (S-IXR). The surface roughness shown in the right-hand image are the retained resin particles, which coat the surface of the sand and provide for multiple adsorption sites for groundwater contaminants. The tables below the images show that the carbon (C) content of the surface is much higher than before treatment, confirming that the particles seen in the image are the ion exchange resin.

Definitions

The terms included in the instant specification to describe the invention have the general meaning as understood by one skilled in the art. Additional meanings are provided below to further describe the instant invention.

The term "ion-exchange resin" (IXR) as used herein refers to an ion-exchange resin or ion-exchange polymer that acts as a medium for ion exchange. It is an insoluble matrix (or support structure) normally in the form of small (0.25-0.5 mm radius) microbeads, usually white or yellowish, fabricated from an organic polymer substrate. The beads are typically porous providing an appreciable surface area on and inside them where the trapping of ions occurs along with the accompanying release of other ions, and thus the process is called ion exchange. There are multiple types of ion-exchange resin. Most commercial resins are made of polystyrene sulfonate.

Ion-exchange resins are widely used in different separation, purification, and decontamination processes. The most common examples are water softening and water purification. In many cases ion-exchange resins were introduced in such processes as a more flexible alternative to the use of natural or artificial zeolites. Also, ion-exchange resins are highly effective in the biodiesel filtration process.

The four main types of ion-exchange resins differ in their functional groups:

- strongly acidic, typically featuring sulfonic acid groups, e.g. sodium polystyrene sulfonate or polyAMPS,
- strongly basic, typically featuring quaternary amino groups, for example, trimethylammonium groups, e.g. polyAPTAC),
- weakly acidic, typically featuring carboxylic acid groups,
- weakly basic, typically featuring primary, secondary, and/or tertiary amino groups, e.g., polyethylene amine.

Illustrative examples of IXR include Amberlite™ HPR1200 Na, Lewatit™ Monoplus S100, Amberlite™ IR120 Na, Lewatit™ S100, Amberlite™ HPR8300 H, Amberlite™ IRC83 H, Lewatit™ CNP80, Amberlite™ HPR4200 Cl, Lewatit™ Monoplus M500, Amberlite™ IRA402 Cl, Lewatit™ M500, Amberlite™ HPR9600, Amberlite™ IRA96, Lewatit™ Monoplus MP64, Amberlite IRA910, Amberlite IRA67, and Amberlite IRA 400.

The term "comprising" as used herein is intended to include the components along with other components mentioned therewith. For example, in the sentence, "The composition comprises component 1, component 2, and component 3" the term "comprises" is used to indicate that the composition mainly consists of the three components, and components in addition to the three components may be present, though in a significantly lesser amount.

The term "microporous beads" as used herein is intended to represent a support structure and range in diameter from about 0.2 mm to about 1.5 mm. They are usually white or yellowish, preferably fabricated from an organic substrate. The beads are typically porous providing a large surface area on and inside them facilitating trapping of ions along with the accompanying release of other ions, and thus facilitate the process called ion exchange. There are multiple types of ion-exchange beads, the most common commercial microporous beads are made of polystyrene sulfonate.

The term "aqueous composition" as used herein in intended to represent a composition comprising of the ionic resin (IXR), a water-soluble surfactant, and a buffer component with water as a solvent. The meanings of the terms IXR, water soluble substituent, and buffer component are as defined elsewhere in this document. The aqueous composition can be colloidal, clear, homogenous, or a suspension, heterogenous, or a combination thereof. The pH of the aqueous composition is intended to be between about 5 and 8.

The term "water soluble polymer" as used herein is intended to represent a polymer that is water soluble or water miscible and is part of the water-soluble surfactant component of the aqueous composition. Water-soluble polymers are substances that dissolve, disperse, or swell in water and, thus, modify the physical properties of aqueous systems in the form of gelation, thickening, or emulsification/stabilization. Additional water-soluble polymers are as described in Will, R.; Loechner, U.; Yokose, K. Synthetic Water-Soluble Polymers, http://www.sriconsulting.com/CEH/Public/Reports/582.0000/, which are incorporated herein by reference. Illustrative examples of water-soluble polymers are Pluronic F-127, Tween 80, Gum Arabic, and HEC-10.

The term "buffer component" as used herein is intended to represent a substance that when added to an aqueous mixture helps maintain the pH of the aqueous mixture within a desired pH range. In the instant case, the buffer component helps maintain the pH of the aqueous mixture between about 5 and 8. Illustrative examples of a buffer component are NaCl, NaOH, $CaCl_2$, $Ca(OH)_2$ and KCl. It is understood that one skilled in the art can substitute the buffer component with components that would help maintain the pH between the desired pH range.

The term "surfactant" as used herein is intended to represent water soluble polymeric substance having the characteristic of hydrophilic and hydrophobic moieties capable of stabilizing particles in aqueous suspensions. Illustrative examples of surfactants are Pluronic F-127, Tween 80, Gum Arabic, and HEC-10.

The term "chemical contaminant" is intended to represent/indicate situations where chemicals are either present where they shouldn't be, or are at higher concentrations than they would naturally have occurred. Chemical contaminants can be found as organic and inorganic molecules in mass produced products used day to day by almost everybody. These include plastics, resins, pharmaceuticals, disinfectants, deodorants, detergents, petroleum products, road run-off, pesticides and biocides, along with the results of land fill and incineration. Chemical contaminants are chemicals toxic to humans, plants and animals in waterways. Chemical contaminants include chemical entities having a strong carbon-halogen bond and further the chemical entities can be ionic in nature. Illustrative examples of chemical contaminants are perfluoro alkyl, polyfluoroalkyl compounds, arsenic compounds, perchlorates, organic matter, organic acids, and ionic water contaminants selected from organic acids, and ionic water contaminants selected from nitrates, phosphates, and halogens.

The term "absorptive zone" as used herein is intended to describe/represent an area that is generally contaminated with chemical contaminants and wherein the contaminants are mixing with ground water or transported to water reservoirs thereby contaminating the water supply. Absorptive zones can be present between the contaminant source, such as a factory or a chemical plant, and the water storage or a body of water, such as a lake. The absorptive zone can also be created between the exit point of a water reservoir and the distribution network for the water wherein the absorptive zone is akin to a "filter" wherein the water passes through this filter. The absorptive zone comprises the composition of the instant invention and its function is to trap the chemical contaminants.

The term "solid host" as used herein is intended to represent materials generally found in the ground including sand, silt, and clay minerals. A solid host generally is capable of being coated by the aqueous composition of the instant invention. A solid host can also include materials like carbon or polymers which can be used in household filtration devices to purify water for use at home.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting. Although methods and materials similar or equivalent to those described herein can be used in the practice or testing of this disclosure, suitable methods and materials are described below.

What is claimed is:

1. A process of isolating chemical contaminants, said process comprising contacting an absorptive zone with a source comprising the chemical contaminants, wherein the absorptive zone comprises an aqueous composition comprising:

(a) an ion-exchange resin (IXR) comprising microporous beads having a particle size in the range from about 100 μm to about 1000 μm;

(b) a water-soluble surfactant having a molecular weight in the range from about 7,500 to about 15,000 Da; and (c) a buffer component;

wherein the pH of the aqueous composition is in the range from about 5 to about 8.

2. The process of claim 1, wherein the absorptive zone comprises solid host soil particles coated with the aqueous composition.

3. The process of claim 1, wherein the absorptive zone essentially consists of sand, silt, and clay minerals coated with the aqueous composition.

4. The process of claim 1, wherein the absorptive zone is produced by injecting the aqueous composition in an area needing isolation of the chemical contaminants.

5. The process of claim 1, wherein the chemical contaminants comprise chemical entities having a carbon-halogen bond, and/or the chemical entities are ionic.

6. The process of claim 1, wherein one or more chemical entities present in said source and/or the chemical contaminants include one or more of the following: perfluoro alkyl, polyfluoroalkyl compounds, arsenic compounds, perchlorates, organic matter, organic acids, and ionic water contaminants comprising nitrates, phosphates, or halogens.

7. The process of claim 1, wherein the IXR comprises sulfonic acid groups, quaternary amino groups, carboxylic acid groups or primary, secondary and/or tertiary amino groups.

8. The process of claim 1, wherein the water-soluble surfactant comprises a water soluble polymer comprising hydrophilic and hydrophobic moieties.

9. The process of claim 1, wherein the aqueous composition has a viscosity from about 3 centipoises to about 10 centipoises.

10. The process of claim 1, wherein the buffer comprises NaCl, NaOH, $CaCl_2$), $Ca(OH)_2$, and KCl.

11. The process of claim 1, wherein the aqueous composition has a viscosity in the range from about 2 centipoises to about 8 centipoises.

12. The process of claim 1, wherein the IXR concentration in the aqueous composition is in the range from about 3000 PPM to about 7000 PPM; wherein the water-soluble surfactant is a water-soluble polymer, and the concentration of the water-soluble polymer is in the range from about 800 PPM to about 2000 PPM.

* * * * *